United States Patent
Tal et al.

(10) Patent No.: US 10,915,518 B2
(45) Date of Patent: Feb. 9, 2021

(54) PARTIAL DISCOVERY OF CLOUD-BASED RESOURCES

(71) Applicant: ServiceNow, Inc., Santa Clara, CA (US)

(72) Inventors: Hail Tal, Kohav Yair (IL); Yuval Rimar, Petah Tikva (IL); Asaf Garty, Sdei Hemed (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/365,433

(22) Filed: Mar. 26, 2019

(65) Prior Publication Data

US 2020/0050596 A1    Feb. 13, 2020

Related U.S. Application Data

(63) Continuation of application No. 16/059,813, filed on Aug. 9, 2018.

(51) Int. Cl.
*G06F 16/23* (2019.01)
*G06F 9/50* (2006.01)
(Continued)

(52) U.S. Cl.
CPC ............ *G06F 16/23* (2019.01); *G06F 9/5077* (2013.01); *G06F 16/9024* (2019.01); *G06F 16/9038* (2019.01); *H04L 41/0853* (2013.01)

(58) Field of Classification Search
CPC .. G06F 16/23; G06F 16/9038; G06F 16/9024; G06F 9/5077; H04L 41/0853
(Continued)

(56) References Cited

U.S. PATENT DOCUMENTS 5,978,594 A    11/1999    Bonnell
6,321,229 B1    11/2001    Goldman
(Continued)

FOREIGN PATENT DOCUMENTS

WO    2008151925 A2    12/2008

OTHER PUBLICATIONS

Extended European Search Report for European Patent Application No. 19190873.0 dated Nov. 15, 2019; 11 pgs.
(Continued)

*Primary Examiner* — Hosain T Alam
*Assistant Examiner* — Saba Ahmed
(74) *Attorney, Agent, or Firm* — Fletcher Yoder PC

(57) ABSTRACT

A computing system may include a database disposed within a remote network management platform that manages a managed network, and server device(s) associated with the platform and configured to: transmit, to a third-party computing system, a request for general information identifying computing resources of the third-party computing system assigned to the managed network; receive, from the third-party computing system, a response indicating resource names and types of the resources that were identified; based on the response, determine that a first resource is of a first type, and responsively store, in the database, a first representation that has just data fields containing the general information from the response that identifies the first resource; and based on the response, determine that a second resource is of a second type, and responsively store, in the database, a second representation that has data fields arranged to contain specific information about the second resource.

14 Claims, 10 Drawing Sheets

(51) Int. Cl.
 *H04L 12/24* (2006.01)
 *G06F 16/901* (2019.01)
 *G06F 16/9038* (2019.01)

(58) Field of Classification Search
 USPC .......................................................... 707/705
 See application file for complete search history.

(56) References Cited

U.S. PATENT DOCUMENTS

| | | | |
|---|---|---|---|
| 6,609,122 B1 | 8/2003 | Ensor | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,877,783 B1 | 1/2011 | Cline | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,266,287 B2 | 9/2012 | Boykin et al. | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,674,992 B2 | 3/2014 | Poston | |
| 8,683,032 B2 | 3/2014 | Spinelli | |
| 8,689,241 B2 | 4/2014 | Naik | |
| 8,743,121 B2 | 6/2014 | De Peuter | |
| 8,832,652 B2 | 9/2014 | Meuller | |
| 8,874,704 B2 | 10/2014 | Nath | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,313,281 B1 | 4/2016 | Lietz et al. | |
| 9,317,327 B2 | 4/2016 | Apte | |
| 9,363,252 B2 | 6/2016 | Mueller | |
| 9,535,737 B2 | 1/2017 | Joy | |
| 9,557,889 B2 | 1/2017 | Raleigh et al. | |
| 9,645,833 B2 | 5/2017 | Mueller | |
| 9,654,833 B2 | 5/2017 | Mueller | |
| 9,754,303 B1 | 9/2017 | Jagtap et al. | |
| 9,760,928 B1 | 9/2017 | Ward, Jr. et al. | |
| 9,766,935 B2 | 9/2017 | Kelkar | |
| 9,792,387 B2 | 10/2017 | George | |
| 9,805,322 B2 | 10/2017 | Kelkar | |
| 9,935,838 B2 | 4/2018 | Lin | |
| 10,044,566 B1 | 8/2018 | Grisco et al. | |
| 10,055,566 B2 | 8/2018 | Kwok-Suzuki et al. | |
| 10,091,067 B2 | 10/2018 | Langston | |
| 10,148,493 B1 | 12/2018 | Ennis | |
| 10,216,621 B1* | 2/2019 | Rutten | G06F 16/2455 |
| 2010/0131957 A1* | 5/2010 | Kami | G06F 9/5077 718/104 |
| 2010/0217837 A1 | 8/2010 | Ansari et al. | |
| 2010/0229171 A1* | 9/2010 | Yoshimura | G06F 9/5077 718/1 |
| 2011/0022812 A1* | 1/2011 | van der Linden | H04L 67/1097 711/163 |
| 2011/0295823 A1* | 12/2011 | Sathish | G06F 16/212 707/705 |
| 2012/0198073 A1* | 8/2012 | Srikanth | H04L 67/10 709/226 |
| 2013/0007760 A1* | 1/2013 | O'Sullivan | G06Q 10/00 718/104 |
| 2014/0019797 A1* | 1/2014 | MacDonald | G06F 11/3006 714/4.1 |
| 2015/0341230 A1* | 11/2015 | Dave | H04L 41/5051 705/7.29 |
| 2016/0105317 A1* | 4/2016 | Zimmermann | H04L 67/16 709/221 |
| 2016/0182299 A1* | 6/2016 | Polinati | H04L 41/0853 709/220 |
| 2017/0104711 A1 | 4/2017 | Hanson et al. | |
| 2018/0146049 A1 | 5/2018 | Africa | |
| 2018/0160431 A1 | 6/2018 | Thies et al. | |
| 2018/0322417 A1* | 11/2018 | Bendre | H04L 41/12 |
| 2018/0322556 A1 | 11/2018 | Padmanabh | |
| 2018/0324198 A1* | 11/2018 | Borthakur | G06F 8/61 |
| 2018/0373774 A1 | 12/2018 | Rangarajan | |

OTHER PUBLICATIONS

BMC Helix Platform Datasheet (obtained Mar. 21, 2019 from www.bmc.com; 2 pages).
BMC Control-M Automation API Datasheet (obtained Mar. 21, 2019 from www.bmc.com; 2 pages).

* cited by examiner

PARTIAL DISCOVERY OF CLOUD-BASED RESOURCES

CROSS REFERENCE TO RELATED APPLICATION

The present application claims priority to U.S. patent application Ser. No. 16/059,813, filed on Aug. 9, 2018, the contents of which are entirely incorporated herein by reference, as if fully set forth in this application.

BACKGROUND

As an enterprise employs cloud-based networks, such as remotely hosted services managed by a third party, it becomes difficult to manage and track the computing resources (e.g., virtual machines and applications) provided by the cloud-based networks. The enterprise might have tools with which to discover and manage devices and services on its own network. However, these tools might have some deficiencies with respect to discovery of computing resources provided by third-party cloud-based networks.

SUMMARY

It is now common for enterprise networks to include tens of thousands of devices across dozens of networks, supporting thousands of users. Enterprise networks may also employ one or more third-party cloud-based networks for application development, data storage, and/or service hosting (e.g., web hosting), among other uses. Advantageously, the hardware and much of the software that make up a cloud-based network are managed by the third party, which allows the enterprise to focus on its specific technical goals, rather than have to administer the day-to-day operations of these cloud-based resources.

The addition of third-party cloud-based networks (also referred to herein as third-party computing systems) extends the computing and storage capabilities of the enterprise. However, there may be deficiencies with respect to existing procedures for discovering computing resources allocated to the enterprise's network by a third-party cloud-based network.

For example, the enterprise might rely on a remote network management platform to engage in such discovery on behalf of the enterprise's managed network. Specifically, server device(s) associated with the remote network management platform may transmit a plurality of requests to a third-party cloud-based network, and may responsively receive a plurality of responses containing information about the computing resources at issue. As part of this procedure, the server device(s) might transmit one request to obtain specific information about a given one of the computing resources, and then transmit another request to obtain specific information about another one of the computing resources, and so on.

Although this procedure may ultimately enable discovery of all or many of the computing resources allocated to the managed network by the third-party cloud-based network, it still has some deficiencies. Specifically, the procedure may require transmission of numerous requests, which may be time-consuming and may utilize processing resources of the remote network management platform that could otherwise be used to carry out other tasks on behalf of the managed network. Moreover, as new types of computing resources (e.g., new applications) become available on the third-party cloud-based network over time, new types of requests may need to be developed, so as to as to enable discovery of those new types of computing resources. Such development of new types of requests may also be time-consuming. And if such a new type of request has not yet been developed, the server device(s) might not even be able to discover a new type of computing resource, assuming it has been allocated to the managed network by the third-party cloud-based network.

Disclosed herein is an approach that involves use of just one or a few requests to obtain information about many or even all of the computing resources allocated to the managed network by a third-party cloud-based network.

In accordance with the disclosed approach, server device(s) associated with the remote network management platform may transmit, to a third-party computing system, a request for general information identifying computing resources of the third-party computing system that are assigned to the enterprise's managed network. When the server device(s) then receive a response to the request, the general information included in the response may indicate at least resource names and resources types of the computing resources that were identified, and may sometimes also include other types of general information about those computing resources.

Once the server device(s) receive the response, the server device(s) may store (e.g., in a database disposed with the remote network management platform) representations that respectively include at least the general information about the identified computing resources. These representations may be visually accessible to client device(s) of the managed network, such as via a graphical user interface, thereby allowing individuals at the enterprise to learn about computing resources allocated to the enterprise's network by the third-party computing system, and perhaps also about relationships between such computing resources.

More specifically, the server device(s) could use the general information included in the response as basis for determining that a first computing resource that was identified is of a first resource type. The server device(s) may not yet be configured to transmit request(s) for specific information about computing resources of this first resource type, as such request(s) may not have been developed yet, or for other reasons. Given this, in response to determining that the first computing resource is of the first resource type, the server device(s) may store a first representation that has just a first set of data fields containing the general information from the response that identifies the first computing resource. In this way, individuals at the enterprise can be made aware that this first computing resource is one of the computing resources allocated to the managed network by the third-party computing system, and may have at least general information about this first computing resource.

Additionally or alternatively, the server device(s) could use the general information included in the response as basis for determining that a second computing resource that was identified is of a second resource type. In this case, the server device(s) may already be configured to transmit request(s) for specific information about computing resources of this second resource type. This specific information may include some information about such computing resources that may not have been included as part of the general information (e.g., a resource version). Given this, in response to determining that the second computing resource is of the second resource type, the server device(s) may store a second representation that has a second set of data fields. The second set may include data fields arranged to contain specific information about the second computing resource, which can be obtain by server device(s) through transmission of request(s) for specific information and then added to the second representation. In some cases, the second set could also include data fields that contain general information from the response that identifies the second computing resource. In this way, individuals at the enterprise can be made aware that this second computing resource is one of the computing resources allocated to the managed network by the third-party computing system, and may have both general and specific information about this second computing resource.

Thus, the disclosed approach may allow the remote network management platform to efficiently provide the enterprise with at least a high-level overview of the computing resources allocated to the enterprise's managed network by a third-party cloud-based network, and do so without necessarily having to rely on time-consuming transmission of numerous requests and/or on development of new types of request(s), among other advantages.

Accordingly, a first example embodiment may involve a computing system including (i) a database device disposed within a remote network management platform that manages a managed network and (ii) one or more server devices associated with the remote network management platform. The one or more server devices may be configured to: transmit, to a third-party computing system, a request for general information identifying computing resources of the third-party computing system that are assigned to the managed network; receive, from the third-party computing system, a response to the request that includes the general information, where the general information included in the response indicates at least resource names and resource types of the computing resources that were identified; based on the response, determine that a first computing resource of the computing resources is of a first resource type, and responsively store, in the database device, a first representation that has just a first set of data fields containing the general information from the response that identifies the first computing resource; and based on the response, determine that a second computing resource of the computing resources is of a second resource type, and responsively store, in the database device, a second representation that has a second set of data fields arranged to contain specific information about the second computing resource, where the second set of data fields includes data fields not in the first set of data fields.

A second example embodiment may involve transmitting, by a computing system to a third-party computing system, a request for general information identifying computing resources of the third-party computing system that are assigned to a managed network, where the computing system includes a database device disposed within a remote network management platform that manages the managed network. The second example embodiment may also involve receiving, by the computing system from the third-party computing system, a response to the request that includes the general information, where the general information included in the response indicates at least resource names and resource types of the computing resources that were identified. The second example embodiment may additionally involve, based on the response, determining, by the computing system, that a first computing resource of the computing resources is of a first resource type, and responsively storing, in the database device, a first representation that has just a first set of data fields containing the general information from the response that identifies the first computing resource. The second example embodiment may further involve, based on the response, determining, by the computing system, that a second computing resource of the computing resources is of a second resource type, and responsively storing, in the database device, a second representation that has a second set of data fields arranged to contain specific information about the second computing resource, where the second set of data fields includes data fields not in the first set of data fields.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
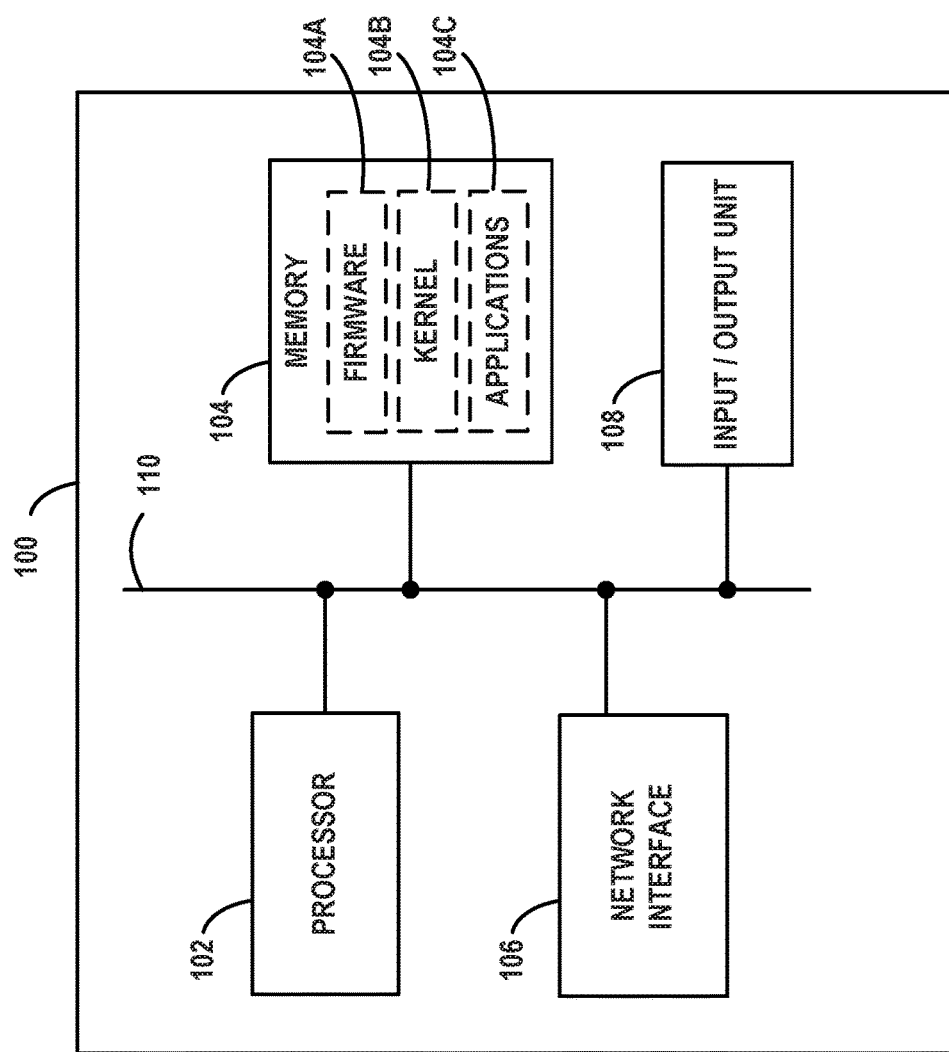
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
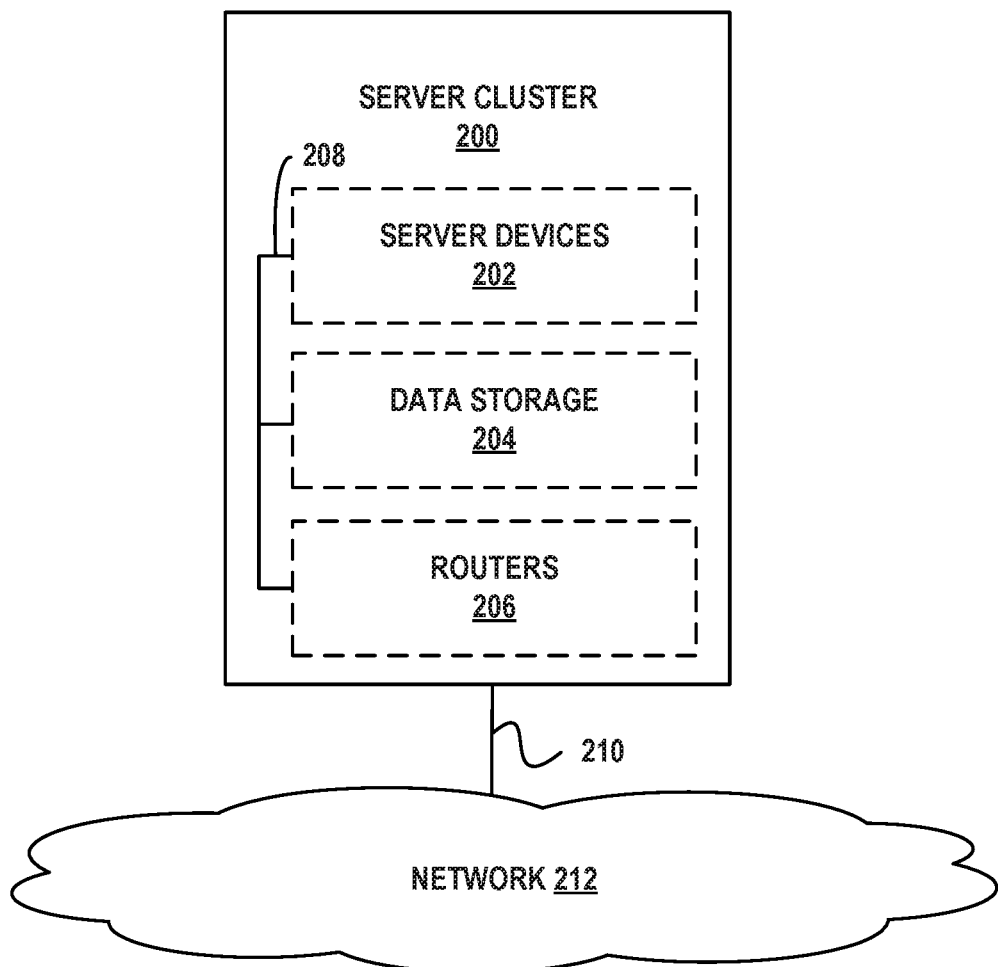
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212. Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
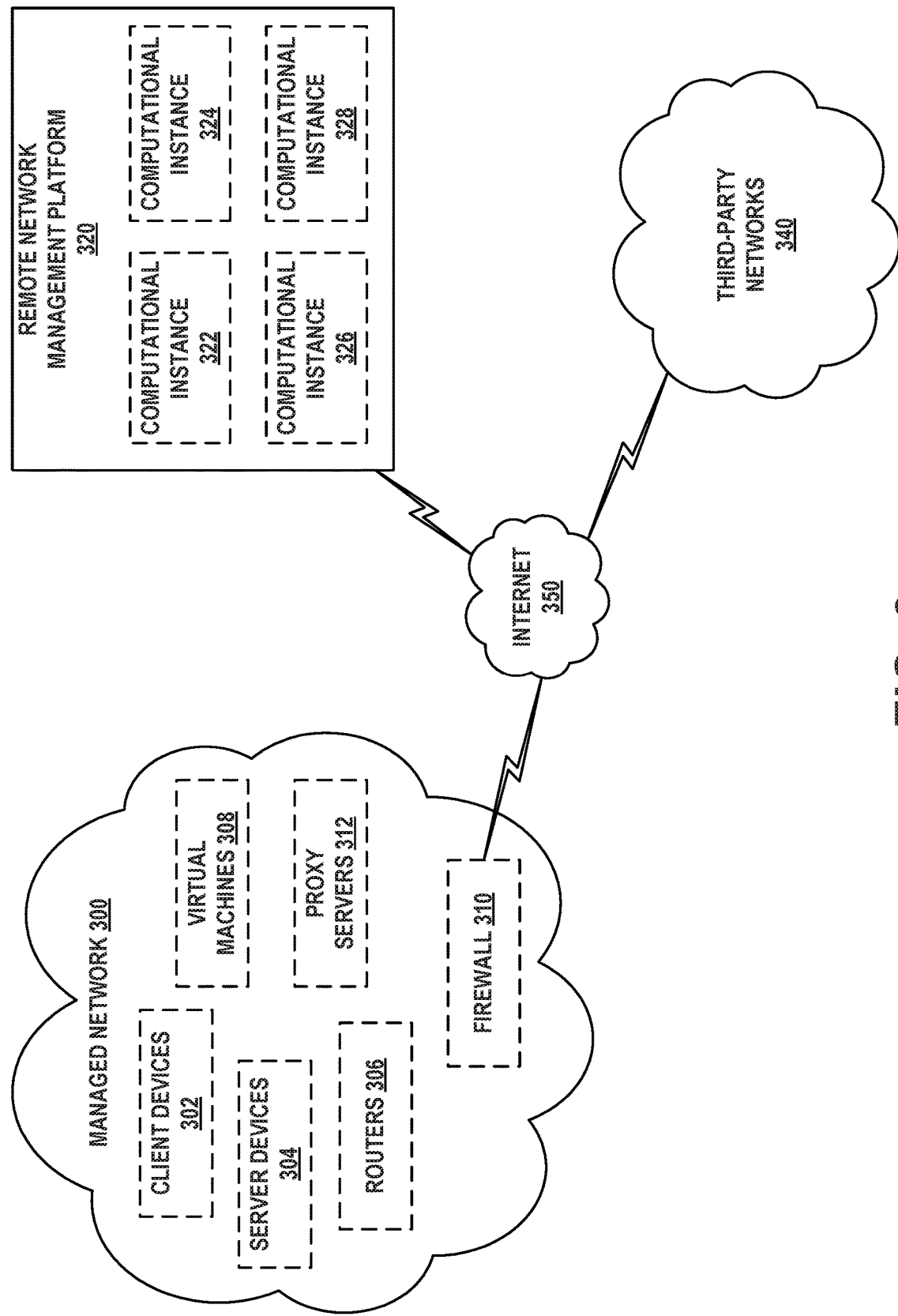
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
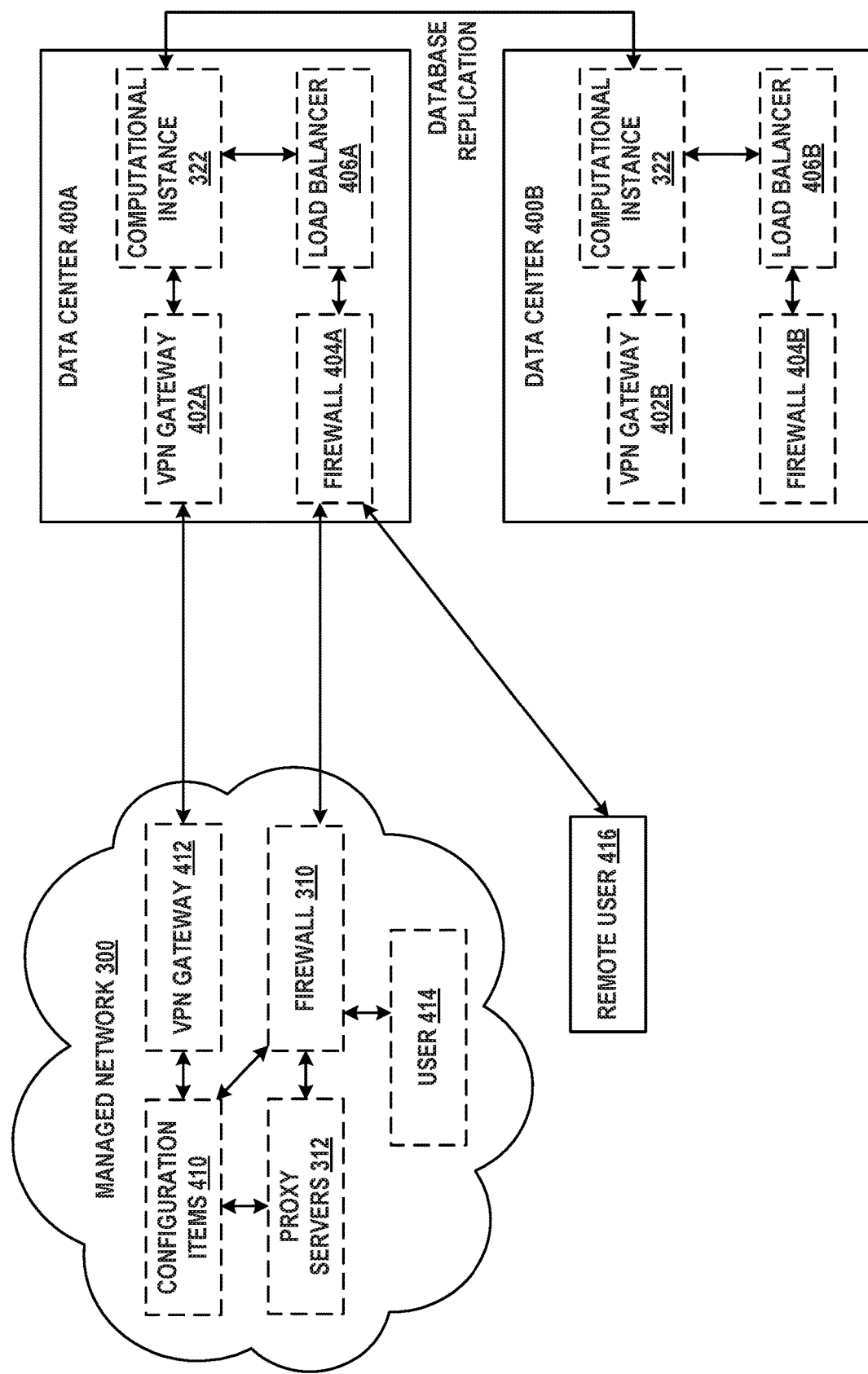
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
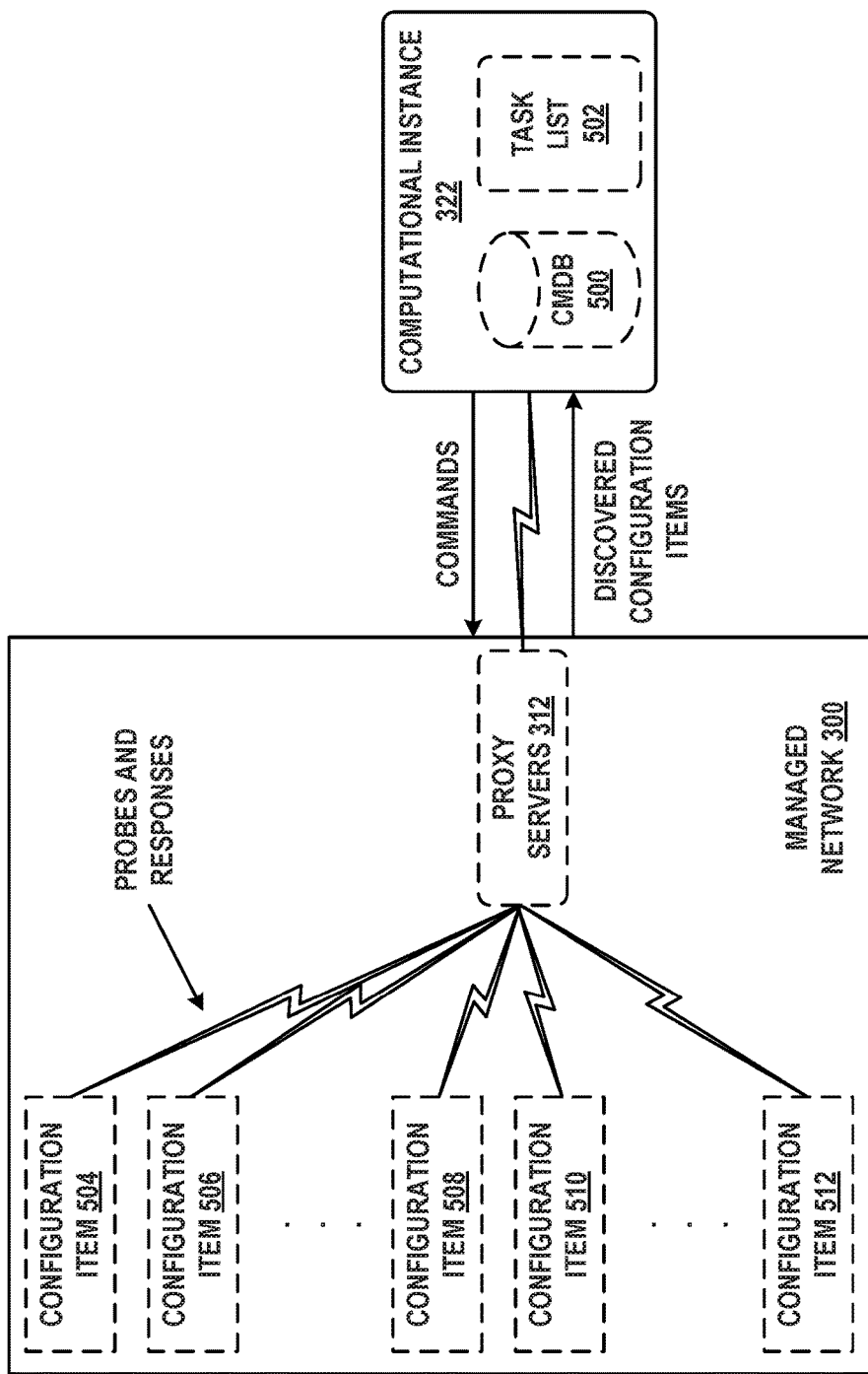
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
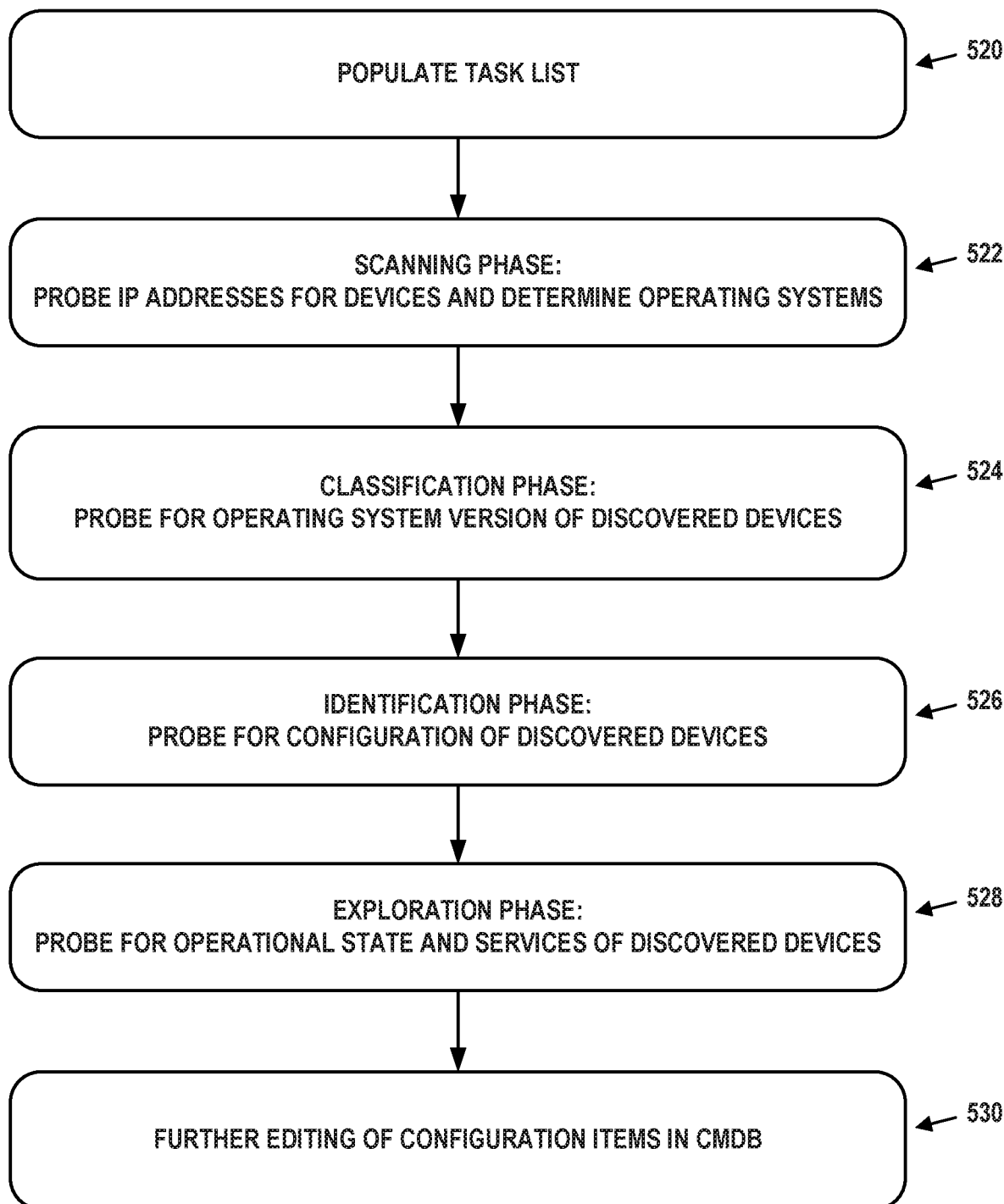
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. EXAMPLE SERVICE MAPPING

Service mapping may involve a computational instance obtaining information related to sets of interconnected computing devices and applications, operating on a managed network, that are configured to provide a service. This service may either be provided internally to the managed network (e.g., an organizational email service) or externally to customers of the managed network (e.g., an external web site). Service mapping builds viewable maps of the configuration items (e.g., the computing devices, applications, and any related configuration information or profiles) used to provide the service. Dependencies between these configuration items may be based on relationships between the computing devices and applications.

Thus, a service map may be a visual representation on a web-based GUI, for instance, that depicts particular applications operating on particular computing devices in the managed network as nodes in a graph. The links of the graph may represent physical and/or logical network connectivity between these nodes. This visual representation allows users to rapidly determine the impact of a problematic configuration item on the rest of the service. For instance, rather than viewing, in isolation, the properties of a database application, this application can be represented as having connections to other applications and the computing devices that rely upon or support the application. Thus, if the database is exhibiting a problem (e.g., running out of storage capacity), the impacted service(s) can be efficiently determined.

Discovery procedures may be used, at least in part, to determine the relationships between computing devices and applications that define services. Alternatively or additionally, services and/or components thereof may be manually defined after discovery has at least partially completed. From this information, a service map can be derived.

VII. EXAMPLE PARTIAL DISCOVERY OF CLOUD-BASED RESOURCES

Although a remote network management platform could engage in discovery procedures on behalf of an enterprise's managed network, such procedures may have some deficiencies with respect to discovery of computing resources allocated to the managed network by a third-party cloud-based network.

For example, existing discovery procedures may involve transmission of numerous requests for information, such as transmission of different requests respectively to obtain specific information about different computing resources. In particular, server device(s) may need to transmit one request to obtain specific information about a given one of the computing resources, and then transmit another request to obtain specific information about another one of the computing resources, and so on.

Due to the nature of existing discovery procedures, individual(s) (e.g., software engineers) may need to engage in development of numerous requests each respectively dedicated to enabling discovery of a certain type of computing resource. For example, individual(s) may need conduct technical research related to a certain type of computing resource, and then write a script customized to this resource type, so that the script can be executed by server device(s) to request and ultimately obtain specific information about computing resource(s) of that type. Such a development process might be repeated for each of various resource types. And even once numerous scripts have been written respectively for many resource types, new types of computing resources might become available on a third-party cloud-based network over time, and thus individual(s) might need to conduct additional research and develop new scripts for those new resource types.

Given this, existing discovery procedures may have several deficiencies. As an initial matter, transmission of numerous requests for information may be time-consuming and may utilize processing resources of the remote network management platform and/or of the third-party cloud-based network that could otherwise be used to carry out other tasks on behalf of the managed network. Also, existing discovery procedures amount to an "all or nothing" approach per computing resource, because, if a request dedicated to a certain resource type has not yet been developed, then existing procedures might not discover nor obtain any information about computing resources of this type even if they are allocated to the managed network. Finally, the process of developing requests may itself be time-consuming, because requests might need to be developed for resource types already available on the third-party cloud-based network and then new requests might need to be developed as new types of resources become available.

For these and other reasons, it is beneficial to improve discovery of computing resources allocated to an enterprise's managed network by a third-party cloud-based network.

Disclosed herein is an approach that may allow the remote network management platform to efficiently provide the enterprise with at least a high-level overview of some or all of the computing resources allocated to the enterprise's managed network by a third-party cloud-based network, and do so without necessarily having to rely on time-consuming transmission of numerous requests and/or on development of new types of request(s).

Figure 6A:
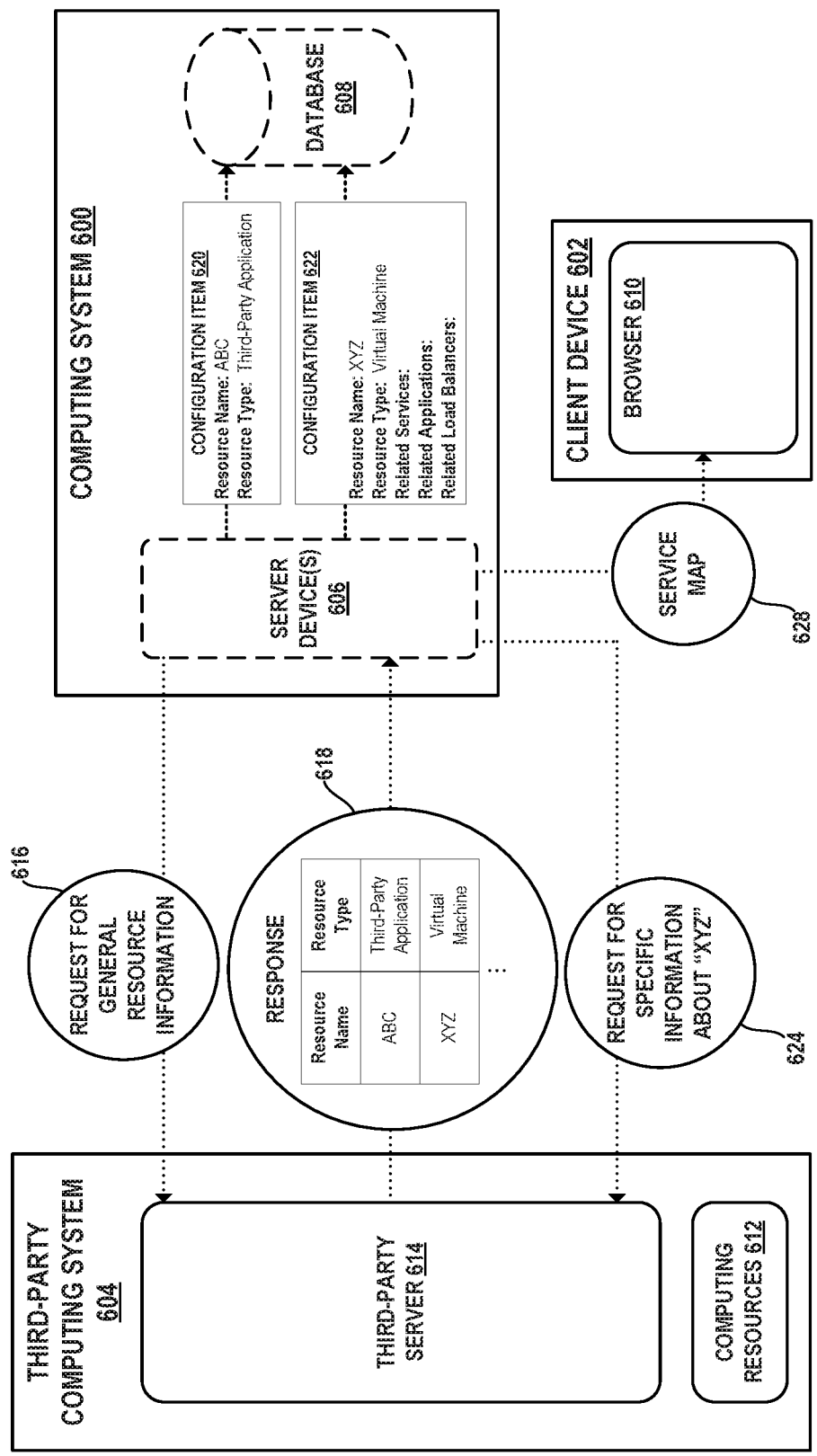
FIG. 6A depicts communications between a computing system, a client device, and a third-party computing system, in accordance with example embodiments.
Figure 6B:
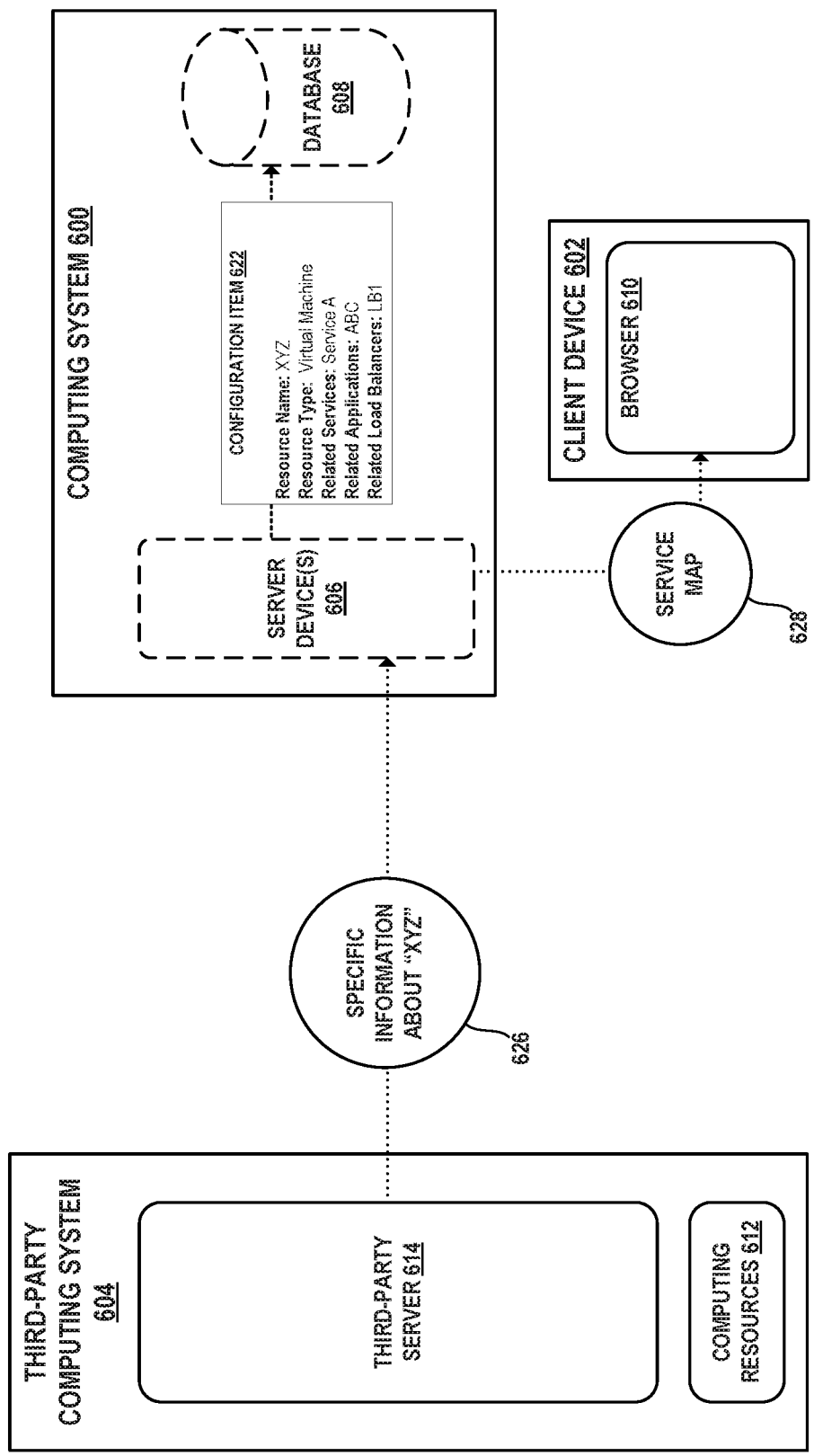
FIG. 6B depicts additional communications between the computing system, the client device, and the third-party computing system, in accordance with example embodiments.

FIGS. 6A and 6B illustrate features, components, and/or operations of a computing system 600, of a managed network's client device 602, and of a third-party computing system 604 having computing resource(s) 612 that could be allocated to the managed network. Although FIGS. 6A and 6B illustrate a specific arrangement, various operations disclosed herein may be carried out in the context of similar and/or other arrangement(s) as well without departing from the scope of the present disclosure.

Specifically, computing system 600 may include server device(s) 606, which may be configured to carry out discovery procedure(s) in line with the discussion above. The server device(s) 606 may contain or may otherwise have access to program instructions executable by processor(s), so as to cause the computing system 600 to carry out various operations described herein. Also, the server device(s) 606 may include server device(s) disposed within a computational instance of a remote network management platform, such as computational instance 322 of remote network management platform 320, and/or may include server device(s) disposed within a managed network, such as proxy server(s) 312 disposed within managed network 300. Thus, the various operations described herein could be carried out by just one server device and/or could be distributed among two or more of server devices in any feasible manner. As such, the computing system 600 could include features and/or components of a managed network and/or of a remote network management platform that supports remote management of the managed network.

Further, as shown, the computing system 600 may include a database 608. This database 608 could be a CMDB of a computational instance, such as CMDB 500 for example. Additionally or alternatively, database 608 may be a database that is different from a CMDB.

Although computing system 600 is shown to include certain features and/or components, computing system 600 may include any feasible combination of features and/or components, so as to facilitate aspects of the present disclosure.

Yet further, as noted, FIGS. 6A and 6B illustrate client device 602, which may be one of the client devices 302 on the managed network 300 for example. Generally, the client device 602 may engage in communication with computing system 600, such as via wired and/or wireless communication link(s) (not shown). Moreover, as shown, the client device 600 may be configured to operate a web browser 610, which is an application that may retrieve, present, and/or navigate through information on the World Wide Web and/or on private websites.

The browser 610 may include a web-display tool (not shown) that provides for or otherwise supports display of information, such as information received from computing system 600. For example, as further discussed herein, the web-display tool may display a visual representation 628 of a service map for computing resources 612 allocated to the managed network 300 by the third-party computing system 604.

Third-party computing system 604 may include a third-party server 614, which could engage in communication(s) with server device(s) 606, and may provide various computing resources 612, which may be allocated to the client device 602's managed network and may be accessible to device(s) of the managed network via a cloud-based platform. For example, the third-party computing system 604 may be a computing system of AMAZON WEB SERVICES® or a computing system of MICROSOFT® Azure, which respectively provide cloud computing platforms.

Generally, the third-party computing system 604 may provide various types of computing resources 612. For example, the third-party computing system 604 may provide physical computing device(s), virtual machine(s), service(s), application(s), load balancer(s), third-party server device(s), and/or third-party database(s), among other options.

On this point, one or more of these computing resources 612 could be allocated for use by the client device 602's managed network. For example, third-party database(s) could be used for storage of certain information on behalf of the managed network. In another example, the third-party computing system 604 may provide an e-mail service for use by device(s) of the managed network. In yet another example, third-party server device(s) could provide processing resource(s) to carry out operations on behalf of the managed network. Other examples are also possible.

In accordance with the present disclosure, server device(s) 606 may transmit, to the third-party computing system 604, a request 616 for general information identifying computing resources of the third-party computing system 604 that are assigned to the client device 602's managed network. In one case, a server device disposed within a computational instance of a remote network management platform could transmit the request 616 directly to the third-party computing system 604. In another case, the server device disposed within the computational instance could transmit the request 616 to the third-party computing system 604 by way of an application on a proxy server (e.g., proxy server(s) 312) disposed within the managed network 300.

In either case, server device(s) 606 could facilitate transmission of the request 616 in various ways. For example, server device(s) 606 may include, communicate with, or otherwise have access to an application programming interface (API) associated with third-party computing system 604 (e.g., a Representational State Transfer (REST) API), and thus may use an API operation to facilitate the request (e.g., a GET operation through the REST API).

Furthermore, the request 616 could be arranged in various ways. For example, the request 616 could indicate credentials for an account that was established to enable devices of the managed network 300 to use computing resource(s) of the third-party computing system 604. The third-party computing system 604 could use such credentials to determine that server device(s) 606 are permitted to receive information about this account. In another example, the request 616 could indicate that the request 616 is for general information identifying computing resource(s) of the third-party computing system 606 that have been associated with the managed network 300's account and thus allocated to the managed network 300. On this point, the request 616 for general information may be a request for any information that the third-party computing system 604 could provide about computing resources allocated to the managed network 300. Additionally or alternatively, the request 616 for general information may be a request for at least resource names and resource types of the computing resources allocated to the managed network 300.

Once the server device(s) 606 transmit the request 616 for general information, the server device(s) 606 may responsively receive, from the third-party computing system 604, a response 618 to the request 616. In one case, a server device disposed within a computational instance of a remote network management platform could receive the response 618 directly from the third-party computing system 604. In another case, the server device disposed within the computational instance could receive the response 618 from the third-party computing system 604 by way of an application on a proxy server (e.g., proxy server(s) 312) disposed within the managed network 300.

Given this, various approaches could be used to facilitate transmission of the request 616 and subsequent receipt of the response 618. For example, a server device disposed within a computational instance may instruct an application on a proxy server disposed within the managed network 300 to transmit the request 616 for general information, and the proxy server application may responsively transmit this request 616 to the third-party computing system 604. In practice, this may involve the proxy server application using the managed network 300's credentials to log in to the managed network 300's account associated with the third-party computing system 604, and then using a GET operation through a REST API to facilitate the request 616. And in response to this GET operation, the third-party computing system 604 may provide, to the proxy server application, a list of identified computing resources that includes the general information about those resources, which effectively amounts to the response 618 at issue. In turn, the proxy server application may forward this response 618 to the server device disposed within the computational instance. Other examples are also possible.

Generally, the response 618 could be a file having a format that is human-readable or machine-readable. For example, the response 618 could take the form of a JavaScript Object Notation (JSON) file, an Extensible Markup Language (XML) file, or another type of text file, among other options. On this point, the server device(s) 606 could convert the response 618 from one file format to another. For example, the server device(s) 606 may use currently known and/or future-developed techniques to convert the response 618 from having a JSON file format to having an XML file format, so as to enable parsing of the response 618 for pattern(s) indicative of general information that identifies computing resources. To carry out such parsing, the server device(s) 606 could include any currently available or future-developed parser as a software component, which could carry out pattern identification and matching based on input data (e.g., response 618), such as using regular expressions, among other possibilities.

As such, the response 618 may include the general information that identifies computing resources of the third-party computing system 604 that are allocated to the managed network 300. In some situations, the general information included in the response 618 may identify each computing resource of the third-party computing system 604 that is allocated to the managed network 300. In such situations, the server device(s) 606 may obtain information about each computing resource allocated to the managed network 300 without having to rely on numerous requests to obtain such information. In other situations, the general information included in the response 618 may identify some of the computing resources of the third-party computing system 604 that are allocated to the managed network 300. This is still advantageous, as the server device(s) 606 may discover these computing resources while transmitting fewer requests for information than the server device(s) 606 would otherwise transmit to discover these computing resources using existing discovery procedures.

In practice, the response 618 could include general information about various types of computing resources allocated to the managed network 300. For example, response 618 could include information about virtual machine(s), service(s), application(s), load balancer(s), third-party server device(s), and/or third-party database(s) of the third-party computing system 604 that are allocated to the managed network 300. Other examples are also possible.

Moreover, the general information included in the response 618 may indicate at least resource names and resource types of the computing resources that were identified. A resource name may be any sequence of letters, numbers, and/or characters established to help individuals recognize a given computing resource. And a resource type may be any sequence of letters, numbers, and/or characters established to help individuals understand which resource category a given computing resource is associated with and thus what this given computing resource might be used for.

In some cases, the general information included in the response 618 may indicate other types of information in addition to resource names and resource types. For example, the general information may indicate resource identifiers (e.g., a serial number), resource locations (e.g., a geographic location at which a computing resource is located), and/or resource versions of the computing resources that were identified. In another example, the general information may indicate associations between computing resources that were identified. In practice, an association between computing resources may represent computing resources being configured to engage in communication with one another and/or may involve a computing resource being configured to host or execute another computing resource (e.g., a third-party server device executing a third-party application), among other options. Other examples are also possible.

FIG. 6A illustrates examples of the general information that could be included in the response 618. For example, as shown, the response 618 indicates that one of the computing resources 612 assigned to the managed network 300 has a resource name of "ABC" and is of a resource type "Third-Party Application". In another example, as shown, the response 618 indicates that another one of the computing resources 612 assigned to the managed network 300 has a resource name of "XYZ" and is of a resource type "Virtual Machine". Other examples and illustrations are also possible.

In some situations, the server device(s) 606 could also obtain specific information about computing resource(s) of the third-party computing system 604, such as through transmission of requests for information that are specific to those computing resource(s), in line with existing discovery procedures as described above. For a given computing resource, such specific information may be at least partially different from the general information in the response 618 that identifies this given computing resource. By way of example, the general information in the response 618 may specify just a resource name and a resource type of the given computing resource. Whereas, the specific information that the server device(s) 606 could obtain about that given computing resource may specify a resource name, a resource type, and a resource location. Other examples are also possible.

In any case, the server device(s) 606 may be configured to obtain such specific information for computing resource of certain types, but not for others. In particular, the server device(s) 606 may be configured to transmit requests for specific information about computing resources of a certain resource types. But the server device(s) 606 may not yet be configured to transmit requests for specific information about computing resources of other resource types, because such requests may not have been developed yet, or for other reasons. To that end, the server device(s) 606 could have access to a resource-type list indicating resource types for which the server device(s) 606 are configured to obtain specific information, and indicating resource types for which the server device(s) 606 are not yet configured to obtain specific information Given this, the server device(s) 606 could store representations of the identified computing resources as discovered configuration items, and the information that each such representation contains or is arranged to contain may depend on the resource type of the identified computing resource being represented.

One type of representation, which is referred herein as a "general" representation, may relate to resource types for which the server device(s) 606 are not yet configured to obtain specific information. In particular, the general representation may have just data fields arranged to contain general information that is provided in the response 618. For example, if the response 618 provides just resource names and resource types of computing resources that were identified, then the general representation would have just a first data field for specifying a resource name of a given computing resource that was identified and a second data field for specifying a resource type of the given computing resource. In another example, if the response 618 provides just resource names, types, and versions of computing resources that were identified, then the general representation would have just a first data field for specifying a resource name of a given computing resource that was identified, a second data field for specifying a resource type of the given computing resource, and a third data field for specifying a resource version of the given computing resource. Other examples are also possible.

Other types of representations, which are referred herein as "specific" representations, may relate to resource types for which the server device(s) 606 are configured to obtain specific information. In particular, a specific representation may have other data field(s) that the general representation does not have, such as data fields arranged to contain specific information. These other data field(s) may differ from one specific representation to another, as the specific information that can be obtained by the server device(s) 606 may be different for different resource types. For example, the specific information that can be obtained by the server device(s) 606 for computing resources of a certain resource type may include a resource location, and thus a specific representation related to that resource type would have a data field for specifying a resource location. Whereas, the specific information that can be obtained by the server device(s) 606 for computing resources of another resource type may include a resource version, and thus a specific representation related to that other resource type would have a data field for specifying a resource version. Other examples are also possible.

In some implementations, a specific representation may also have data fields arranged to contain general information that is provided in the response 618. Such data fields may be included in addition to the other data fields that the general representation does not have. In line with the examples above, if the response 618 provides just resource names and resource types of computing resources that were identified, then a specific representation could also have data fields for respectively specifying a resource name and a resource type of a given computing resource that was identified. Other examples are also possible.

Given such implementations, the server device(s) 606 may use the received response 618 as basis for determining resource types of the computing resources that were identified, and may then store representations of these computing resources according to the determined resource types.

Specifically, the server device(s) 606 may use the received response 618 as basis for determining that a first computing resource that was identified is of a first resource type, and may determine that this first resource type relates to a general representation. To facilitate this, the server device(s) 606 could use the resource-type list to determine that the server device(s) 606 are not yet configured to obtain specific information about computing resources of the first resource type, which may serve as a trigger for using a general representation to represent the first computing resource. Accordingly, the server device(s) 606 may store a first representation of the first computing resource that takes the form of a general representation. Namely, the first representation may have just a first set of data fields containing the general information from the response 618 that identifies the first computing resource.

By way of example, FIG. 6A illustrates that server device(s) 606 store, in the database 608, a general representation of the computing resource "ABC" as a discovered configured item 620. In particular, the server device(s) 606 may use the received response 618 as basis for determining that the computing resource "ABC" that was identified is of a resource type "Third-Party Application", and may determine that this resource type relates to a general representation. Accordingly, as shown, the server device(s) 606 may store a general representation of the computing resource "ABC" that has just a first data field for specifying a resource name of this identified computing resource (i.e., "ABC") and a second data field for specifying the resource type of this identified computing resource (i.e., "Third-Party Application"). Other examples and illustrations are also possible.

In contrast, the server device(s) 606 may use the received response 618 as basis for determining that a second computing resource that was identified is of a second resource type, and may determine that this second resource type relates to a specific representation. Here again, the server device(s) 606 could use the resource-type list to determine that the server device(s) 606 are configured to obtain specific information about computing resources of the second resource type, which may serve as a trigger for using a specific representation to represent the second computing resource. Accordingly, the server device(s) 606 may store a second representation of the second computing resource that takes the form of a specific representation. Namely, the second representation may have a second set of data fields arranged to contain specific information about the second computing resource, and possibly arranged to contain general information from the response 618 that identifies the second computing resource.

In this regard, although the server device(s) 606 may store a specific representation arranged to contain specific and possibly general information about a given computing resource, data field(s) of this specific representation could be populated at various times. In particular, if the specific representation has data fields arranged to contain general information from the response 618 that identifies a given computing resource, then the server device(s) 606 may populate those data fields with the general information from the response 618 that identifies the given computing resource. On the other hand, the specific representation may have data fields arranged to contain specific information about a given computing resource, but the server device(s) 606 may need to transmit additional request(s) for specific information about this given computing resource, so as to be able to populate such data fields of the specific representation. In practice, the server device(s) 606 may transmit such additional request(s) in response to or otherwise after storing of the specific representation.

By way of example, FIG. 6A illustrates that server device(s) 606 store, in the database 608, a specific representation of the computing resource "XYZ" as a discovered configured item 622. In particular, the server device(s) 606 may use the received response 618 as basis for determining that the computing resource "XYZ" that was identified is of a resource type "Virtual Machine", and may determine that this resource type relates to a specific representation. Accordingly, as shown, the server device(s) 606 may store a specific representation of the computing resource "XYZ" that has data fields for specifying a resource name, a resource type, related services, related applications, and related load balancers.

Further, FIG. 6A illustrates that the server device(s) 606 populate the data fields for specifying a resource name and a resource type respectively with the general information from the response 618 that identifies the computing resource "XYZ". However, the server device(s) 606 may not yet populate the data fields for specifying related services, related applications, and related load balancers, as the server device(s) 606 may need to obtain such specific information through transmission of additional request(s).

As such, the server device(s) 606 may transmit, to the third-party computing system 604, an additional request 624 for specific information about computing resource "XYZ". Then, as shown in FIG. 6B, the server device(s) 606 may receive an additional response 626 to the additional request 624 that includes specific information about computing resource "XYZ".

Once the server device(s) 606 receive the additional response 626, the server device(s) 606 may use the specific information from this response 626 to populate at least some of the data fields in the specific representation of the computing resource "XYZ" that have not yet been populated. For example, as shown, the server device(s) 606 may use the specific information from this response 626 to update the specific representation of the computing resource "XYZ", such that it specifies "Service A" as a related service, the above-mentioned computing resource "ABC" as a related application, and "LB1" as a related load balancer. Other examples and illustrations are also possible.

In a further aspect, the server device(s) 606 could transmit request(s) for general information at any time, such as in accordance with a schedule, among other options. And when the server device(s) 606 transmit such a request for general information, this may lead to updating of existing stored representations of identified computing resources and/or to storing of new representations of identified computing resources, among other possibilities.

In particular, after transmitting the request 616 and engaging in the above-described storing of representations of the identified computing resources, the server device(s) 606 may transmit, to the third-party computing system 604, a second request for general information identifying computing resources of the third-party computing system 604 that are assigned to the managed network 300. Then, the server device(s) 606 may receive, from the third-party computing system 604, a second response to this second request, and the server device(s) 606 may evaluate the general information included in this second response, so as to determine whether to update existing stored representations and/or store new representations.

In one case, the server device(s) 606 may determine that a previously stored general representation of an identified computing resource is to be updated based on the second response. For example, the server device(s) 606 may determine that the second response includes an update to the general information that identifies the above-mentioned first computing resource, and may responsively modify data field(s) of the first set in the first representation to contain the update. In a more specific example, the server device(s) 606 may determine that second response indicates that the resource name of the computing resource "ABC" was changed to "ABC123", and may responsively modify the general representation of this computing resource as a discovered configuration item 620 to specify this new resource name (not shown in FIGS. 6A and 6B). Other examples are also possible.

In another case, the server device(s) 606 may determine that a previously stored specific representation of an identified computing resource is to be updated based on the second response. For example, the server device(s) 606 may determine that the second response includes an update to the general information that identifies the above-mentioned second computing resource, and may responsively modify data field(s) of the second set in the second representation to contain the update. Particularly, the server device(s) 606 may determine that second response indicates that the resource name of the computing resource "XYZ" was changed to "XYZ123", and may responsively modify the specific representation of this computing resource as a discovered configuration item 622 to specify this new resource name (not shown in FIGS. 6A and 6B). Other examples are also possible.

In yet another case, the server device(s) 606 may determine that a new representation is to be stored based on the on the second response. In particular, the server device(s) 606 may determine that the general information included in the second response identifies a new computing resource that was not identified in the first response 618, and may responsively store, in the database 608, a new representation of the newly identified computing resource. In this case, the new representation could be a general representation or a specific representation depending on the resource type of the newly identified computing resource, in line with the discussion above. And if the new representation is a specific representation, this may trigger transmission of additional request(s) to obtain specific information about the newly identified computing resource, in line with the discussion above. Other cases are also possible.

In yet a further aspect, the server device(s) 606 may be configured to generate and then store, in the database 608, a service map in accordance with the representations of the identified computing resources as discovered confirmation items. This generated service map may be a definition of a graph that represents (i) one or more of the computing resources that were identified as respective nodes and (ii) associations between identified computing resources as respective links. Further, the server device(s) 606 could provide, to the client device 602 for display, a representation 628 of the service map in accordance with the stored definition. The server device(s) 606 could do so in response to receipt, from the client device 602, of a request for the service map, among other options. In any case, when the client device 602 receives the representation 628, the client device 602 may visually display the representation 628 on a graphical user interface in the browser 610, among other possibilities.

In this regard, the graphical user interface may include selectable control(s) that enable editing of the representation 628 of the service map by way of the graphical user interface. For example, the graphical user interface may include a selectable control that enables removal of a link between a node representing one identified computing resource and a node representation another identified computing resource, so that the representation 628 of the service map no longer illustrates a relationship between those identified computing resources. In another example, the graphical user interface may include a selectable control that enables addition (i) of a new node representing a computing resource that may not have been discovered by the server device(s) 606 and (ii) of a link between this new node and a node representing one of the identified computing resources. Other examples are also possible.

Figure 7:
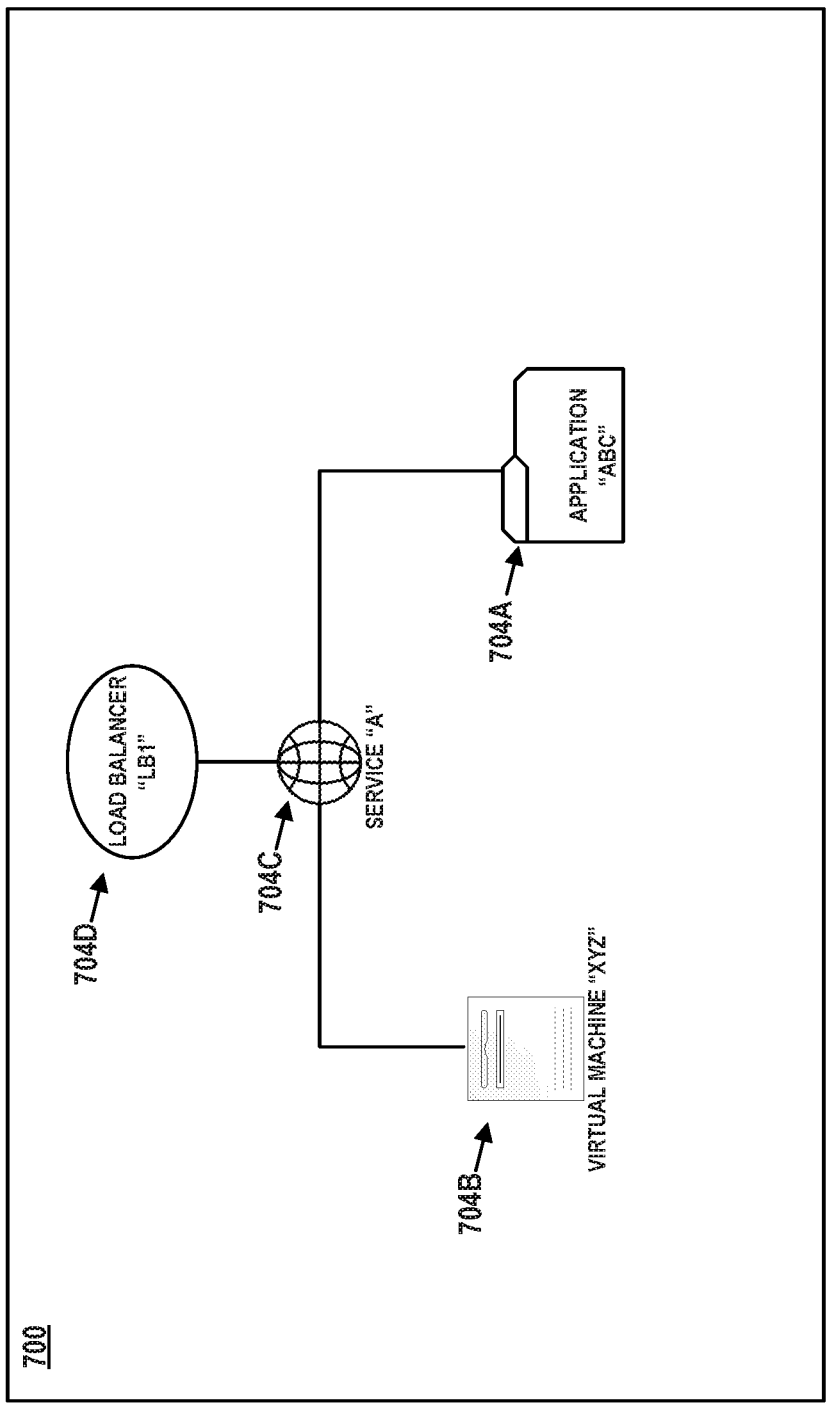
FIG. 7 depicts a graphical user interface representation of a service map, in accordance with example embodiments.

FIG. 7 illustrates a graphical user interface 700 that visually displays the representation 628 of the service map. This service map illustrates respective relationships between the computing resources of the third-party computing system 604 that were discovered by the server device(s) 606. In particular, the visually displayed representation 628 of the service map illustrates computing resources "ABC", "XYZ", "Service A", and "LB1" as respective nodes 704A, 704B, 704C, and 704D in the graph, and also illustrates the associations therebetween as respective links. In line with the discussion above, the respective links might visually indicate that computing resources are configured to engage in communication with one another and/or that one computing resource is configured to host or execute another computing resource, among other options. Other illustrations are also possible.

VIII. EXAMPLE OPERATIONS

Figure 8:
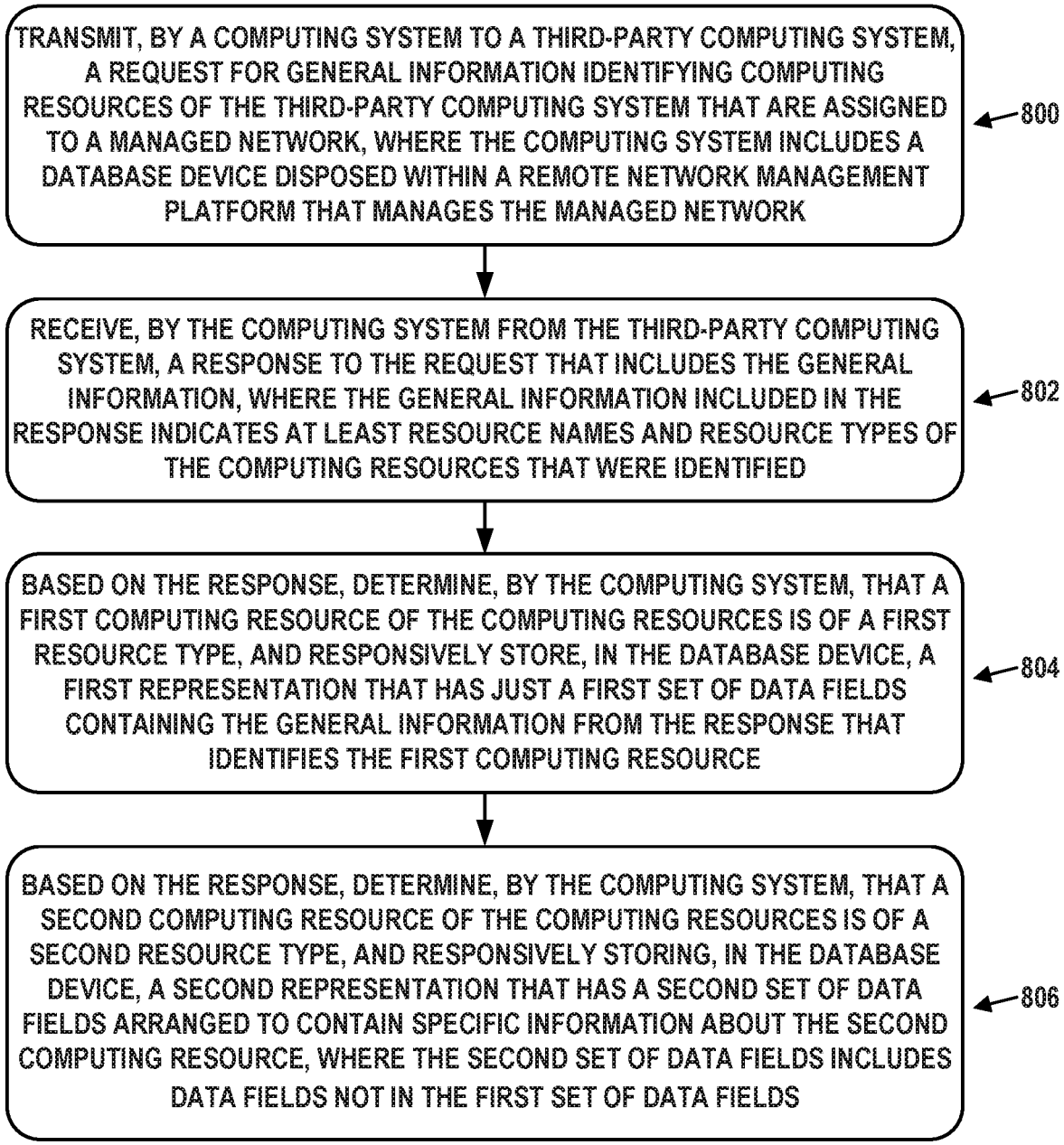
FIG. 8 is another flow chart, in accordance with example embodiments.

FIG. 8 is a flow chart illustrating an example embodiment. The process illustrated by FIG. 8 may be carried out by a computing system, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve transmitting, by a computing system to a third-party computing system, a request for general information identifying computing resources of the third-party computing system that are assigned to a managed network, where the computing system includes a database device disposed within a remote network management platform that manages the managed network.

Block 802 may involve receiving, by the computing system from the third-party computing system, a response to the request that includes the general information, where the general information included in the response indicates at least resource names and resource types of the computing resources that were identified.

Block 804 may involve, based on the response, determining, by the computing system, that a first computing resource of the computing resources is of a first resource type, and responsively storing, in the database device, a first representation that has just a first set of data fields containing the general information from the response that identifies the first computing resource.

Block 806 may involve, based on the response, determining, by the computing system, that a second computing resource of the computing resources is of a second resource type, and responsively storing, in the database device, a second representation that has a second set of data fields arranged to contain specific information about the second computing resource, where the second set of data fields includes data fields not in the first set of data fields.

In some embodiments, one or more server devices of the computing system may carry out the process of blocks 800-806.

In some embodiments, the database device may comprise a CMDB disposed within a computational instance of the remote network management platform, the CMDB may contain information about a plurality of configuration items associated with the managed network, the first representation may be of the first computing resource as a discovered configuration item, and the second representation may be of the second computing resource as another discovered configuration item.

In some embodiments, the computing resources that were identified may comprise one or more of: one or more virtual machines, services, applications, load balancers, third-party servers, or third-party databases. And the computing resources were allocated to the managed network by the third-party computing system.

In some embodiments, the general information included in the response may also indicates one or more of the following for the computing resources that were identified: (i) resource identifiers, (ii) resource locations, and (iii) resource versions.

In some embodiments, the general information included in the response may identify each computing resource of the third-party computing system that is assigned to the managed network.

In some embodiments, the computing system may make a first determination that the one or more server devices are not yet configured to transmit additional requests for specific information about computing resources of the first resource type. In this situation, storing the first representation that has just the first set of data fields may be further responsive to making the first determination. Moreover, the computing system may make a second determination that the one or more server devices are configured to transmit additional requests for specific information about computing resources of the second resource type. In this situation, storing the second representation that has the second set of data fields arranged to contain specific information may be further responsive to making the second determination.

In some embodiments, the computing system may (i) transmit, to the third-party computing system, an additional request for specific information about the second computing resource; (ii) receive, from the third-party computing system, an additional response to the additional request that includes specific information about the second computing resource; and (iii) update the second representation to specify, in one or more data fields of the second set, specific information about the second computing resource included in the additional response.

In such embodiments, the computing system may transmit the additional request after storing the second representation in the database device.

In some embodiments, the request may be a first request, the response may be a first response, and the computing system may: (i) transmit, to the third-party computing system, a second request for the general information identifying computing resources of the third-party computing system that are assigned to the managed network; (ii) receive, from the third-party computing system, a second response to the second request; and (iii) determine that the second response includes an update to the general information that identifies the first computing resource, and responsively modify one or more data fields of the first set in the first representation to contain the update to the general information that identifies the first computing resource.

In some embodiments, the second set of data fields may include at least some data fields that are also in the first set of data fields, and the second representation may specify, in one or more data fields of the second set, the general information from the response that identifies the second computing resource.

In such embodiments, the request may be a first request, the response may be a first response, and the computing system may: (i) transmit, to the third-party computing system, a second request for the general information identifying computing resources of the third-party computing system that are assigned to the managed network; (ii) receive, from the third-party computing system, a second response to the second request; and (iii) determine that the second response includes an update to the general information that identifies the second computing resource, and responsively modify one or more data fields of the second set in the second representation to contain the update to the general information that identifies the second computing resource.

In some embodiments, the request may be a first request, the response may be a first response, and the computing system may: (i) transmit, to the third-party computing system, a second request for the general information identifying computing resources of the third-party computing system that are assigned to the managed network; (ii) receive, from the third-party computing system, a second response to the second request; and (iii) determine that the general information included in the second response identifies a new computing resource that was not identified in the first response, and responsively store, in the database device, a new representation of the new computing resource.

In some embodiments, the general information included in the response may also indicate associations between at least two of the computing resources that were identified, and the computing system may store, in the database device, representations of the associations indicated in the response.

In such embodiments, the computing system may generate a definition of a graph that represents (i) one or more of the computing resources that were identified in the response as respective nodes and (ii) one or more of the associations as respective links; and the computing system may also store the definition of the graph in the database device In such embodiments, the computing system may provide, to a client device associated with the managed network, a representation of a graphical user interface that displays the graph in accordance with the stored definition.

In some embodiments, a proxy server application may be disposed within the managed network, and the one or more server devices may be configured to transmit the request and receive the response by: (i) transmitting the request to the third-party computing system by way of the proxy server application; and (ii) receive the response from the third-party computing system by way of the proxy server application.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
persistent storage; and
one or more server devices disposed in a managed network, wherein the one or more server devices are configured to:
receive, from an external cloud-based computing system, general information identifying each computing resource of the external cloud-based computing system that is assigned to the managed network, wherein the general information indicates respective resource types of the computing resources assigned to the managed network, and wherein the external cloud-based computing system is disposed outside of the managed network;
determine that the one or more server devices are configured to send respective requests to the external cloud-based computing system for specific information associated with at least one computing resource of the computing resources based on the respective resource types of the at least one computing resource;
transmit the respective requests to the external cloud-based computing system for the specific information associated with the at least one computing resource in response to determining that the one or more server devices are configured to send the respective requests to the external cloud-based computing system;
receive, from the external cloud-based computing system, the specific information associated with the at least one computing resource, wherein the specific information comprises a set of data fields not present within the general information; and
store, in the persistent storage, the general information associated with the computing resources assigned to the managed network and the specific information associated with the at least one computing resource.

2. The computing system of claim 1, wherein the persistent storage comprises a configuration management database (CMDB) disposed within a computational instance of a remote network management platform, wherein the remote network management platform is associated with the managed network, wherein the CMDB contains information about a plurality of configuration items associated with the managed network, and wherein the general information associated with the computing resources assigned to the managed network and the specific information associated with the at least one computing resource is stored as respective configuration items.

3. The computing system of claim 1, wherein the computing resources comprise one or more virtual machines, one or more services, one or more applications, one or more load balancers, one or more server devices, or one or more databases, or any combination thereof, assigned to the managed network.

4. The computing system of claim 1, wherein the general information indicates, for the computing resources assigned to the managed network, one or more of: (i) resource names, (ii) resource identifiers, (iii) resource locations, or (iv) resource versions.

5. The computing system of claim 1, wherein the one or more server devices are configured to:
determine that the one or more server devices are not configured to transmit respective additional requests to the external cloud-based computing system for specific information associated with at least one additional computing resource of the computing resources based on the respective resource types of the at least one additional computing resource.

6. The computing system of claim 1, wherein the one or more server devices are configured to:
transmit, to the external cloud-based computing system, a new request for the general information identifying the computing resources of the external cloud-based computing system that are assigned to the managed network;
receive, from the external cloud-based computing system, a response to the new request;
determine that the response includes an update to the general information; and
update one or more data fields in the general information stored in the persistent storage based on the update to the general information.

7. The computing system of claim 1, wherein the general information and the specific information associated with the at least one computing resource is stored as a respective configuration item, and wherein the one or more server devices are configured to:
transmit, to the external cloud-based computing system, a new request for the general information identifying the computing resources of the external cloud-based computing system that are assigned to the managed network;
receive, from the external cloud-based computing system, a response to the new request;
determine that the response includes an update to the general information; and
modify one or more data fields of the respective configuration item based on the update to the general information.

8. The computing system of claim 1, wherein the one or more server devices are configured to:
transmit, to the external cloud-based computing system, a new request for the general information identifying the computing resources of the external cloud-based computing system that are assigned to the managed network;
receive, from the external cloud-based computing system, a response to the new request;
determine that the general information included in the response identifies a new computing resource assigned to the managed network that was not previously identified; and
store, in the persistent storage, the general information associated with the new computing resource.

9. The computing system of claim 1, wherein the general information indicates one or more associations between at least two computing resources of the computing resources assigned to the managed network, and wherein the one or more server devices are configured to:

store, in the persistent storage, respective representations of the one or more associations indicated in the general information.

10. The computing system of claim 9, wherein the one or more server devices are configured to:

generate a definition of a graph that represents (i) the at least two computing resources as respective nodes and (ii) the one or more associations as respective links; and store, in the persistent storage, the definition of the graph.

11. The computing system of claim 10, wherein the one or more server devices are configured to:

provide, to a client device, a representation of a graphical user interface that displays the graph in accordance with the definition of the graph.

12. The computing system of claim 1, wherein a proxy server application is disposed within the managed network, and wherein the one or more server devices are configured to receive the general information from the external computing system by way of the proxy server application.

13. A method comprising:

receiving, by a computing system disposed in a managed network and from an external cloud-based computing system disposed outside of the managed network, general information identifying each computing resource of the external cloud-based computing system that is assigned to the managed network, wherein the general information indicates a respective resource type of each computing resource assigned to the managed network;

transmitting, by the computing system, respective requests to the external cloud-based computing system for specific information associated with at least one computing resource of the computing resources based on the respective resource type of the at least one computing resource;

receiving, by the computing system from the external cloud-based computing system, the specific information associated with the at least one computing resource, wherein the specific information comprises a set of data fields not present within the general information; and storing, by the computing system in the persistent storage, the general information associated with the computing resources assigned to the managed network and the specific information associated with the at least one computing resource.

14. An article of manufacture including a non-transitory computer-readable medium, having stored thereon program instructions that, upon execution by a computing system that includes persistent storage, cause the computing system to perform operations comprising:

receiving, from an external cloud-based computing system disposed outside of a managed network, general information identifying each computing resource of the external cloud-based computing system that is assigned to the managed network, wherein the general information indicates a respective resource type of the computing resources assigned to the managed network;

transmitting respective requests to the external cloud-based computing system for specific information associated with at least one computing resource of the computing resources based on the respective resource type of the at least one computing resource;

receiving, from the external cloud-based computing system, the specific information associated with the at least one computing resource, wherein the specific information comprises a set of data fields not present within the general information; and storing, in a persistent storage, the general information associated with the computing resources assigned to the managed network and the specific information associated with the at least one computing resource.

\* \* \* \* \*